April 17, 1928.
C. C. BRADBURY
1,666,365
NONEXPANSIVE HOSE
Filed April 23, 1926
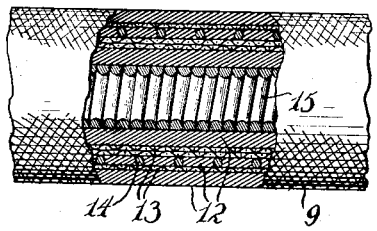
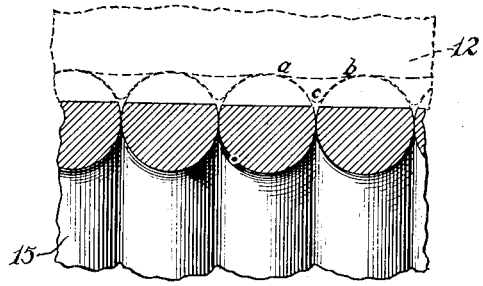
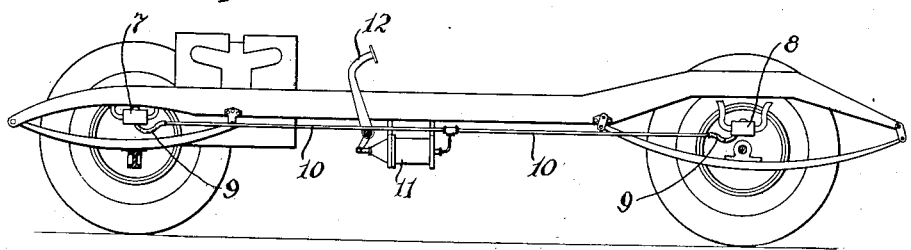
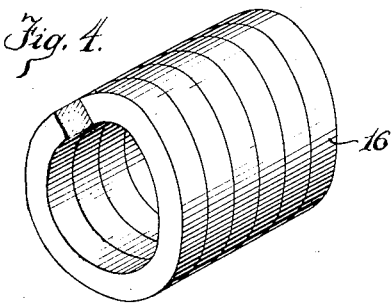
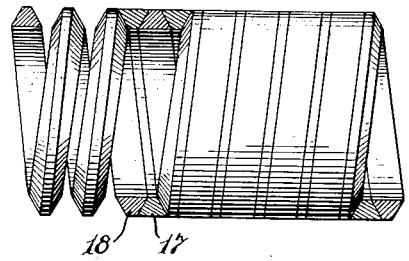
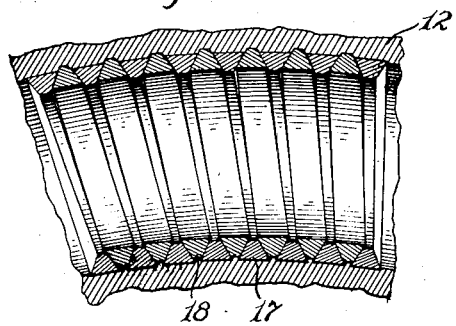
Inventor
Clifford C. Bradbury
By Williams, Bradbury,
McCaleb & Hinkle
Attorneys.

Patented Apr. 17, 1928.

1,666,365

UNITED STATES PATENT OFFICE.

CLIFFORD C. BRADBURY, OF GLENCOE, ILLINOIS, ASSIGNOR TO HYDRAULIC BRAKE COMPANY, OF DETROIT, MICHIGAN, A CORPORATION OF CALIFORNIA.

NONEXPANSIVE HOSE.

Application filed April 23, 1926. Serial No. 104,051.

My invention relates generally to nonexpansive hose and more particularly to the type of hose which is adapted for use in high pressure hydraulic apparatus, such as hydraulic automobile brake systems.

It is an object of my invention to provide an improved flexible hose which is capable of withstanding high internal pressures without appreciable changes in volume.

A further object of my invention is to provide an improved flexible non-expansive hose in which the non-collapsible coil which is inserted in the hose has a practically unbroken outer cylindrical surface so that the rubber and fabric tubular portion which surrounds the coil, is at all times under uniform tension and will not contract and thus diminish the internal volume of the hose when the internal pressure is decreased.

A further object is the provision of a non-collapsible coil of wire for insertion in the tubular rubber fabric portion of the hose which when flexed will not tend to pinch the rubber portion of the hose.

Other objects will appear from the following description reference being made to the accompanying drawings in which:

Figure 1 shows a hose partly in section, made according to my invention.

Figure 2 is a cross section of a portion of the hose.

Figure 3 is a diagrammatic view of the chassis of an automobile equipped with a hydraulic brake system.

Figure 4 is a perspective view of a modified form of coil.

Figure 5 is an elevation of a second modification of the coil; and

Figure 6 is a section of a portion of the flexed hose in which the coil shown in Figure 5 is used.

For some time relatively non-expansive hoses have been made for use in hydraulic pressure systems. In the patent to Loughead No. 1,457,781, a hose of this kind and the method for making it are fully disclosed. Only the principal features of that construction will be given here. The hose constructed according to this prior art consisted of layers of rubber and fabric which, when stretched by internal fluid pressure, had a coil of wire, having an outer diameter substantially the same as the internal diameter of the expanded hose, forced into the hose. Upon removal of the fluid pressure the rubber and fabric of the hose was thus stretched around the coil of wire. The pressure at which the rubber and fabric is expanded or stretched in constructing the hose is considerably higher than that normally employed in the operation of the hydraulic system. It will therefore be apparent that in using a hose thus constructed, the hydraulic pressure will have to build up sufficient to overcome this initial tension in the hose before it will expand the rubber and fabric of the hose.

Theoretically there should be no expansion of the hose until the pressure at which the hose was made is reached. In practice, however, it was found that there was an appreciable amount of oil displacement lost due to expansion of the hose at pressures considerably lower than that at which the hose was constructed.

In Figure 2 an enlarged portion of the coil 15 is shown in section, and the former construction of the coil in which a wire of circular cross-section was employed is shown in dotted lines, and the adjacent layer of rubber indicated in dotted lines at 12. It was discovered that the helix of rubber having the irregular cross section $abc$ lying between the turns of the coil was the cause of this discrepancy between the theoretical and actual results. When the hose was under the high pressure during the process of making it, its inner cylindrical surface was along the line $ab$. However, after the coil had been inserted and the pressure released, the rubber between the points $a$ and $b$, for example, would, it is believed, contract into the space between two adjacent turns of the coil of wire. Upon using the hose, these inwardly projecting spirals of rubber would be forced back so that the rubber would again assume a cylindrical inner surface along the line $ab$. The pressure at which this helical portion of the rubber would be forced back was found to be considerably lower than that used in the normal operation of the braking system. Specifically therefore, it is the purpose of this invention to overcome this disadvantageous feature of the non-expansive hose which was constructed with the coil of wire of circular cross section.

In Figure 3 the brake mechanisms 7 and 8 are connected by short lengths of flexible hose 9 to the pipes 10 which communicate with the cylinder 11, the piston of which is actuated by the brake pedal 12. Upon operating the brake pedal, extremely high pressures are built up in the cylinder 11 and transmitted through the pipes to the flexible hoses 9. The hose 9 must be constructed to be readily flexible because of the relative movement of the wheel and the chassis, and must be adapted to withstand this high pressure without appreciable expansion. If the hose were of ordinary construction, partial operation of the brake pedal would effect only expansion of the hose. Due to the increase in the volume of the hose, effective quick operation of the brake mechanism would be prevented. It is obviously desirable that fluid displaced by the brake pedal be transmitted to the braking mechanism instantly and without diminution. This is not possible if the volume of the bore of the hose increases with an increase in pressure.

In Figure 1 the hose 9 is constructed of layers of rubber 12 alternating with the layers of fabric 13. Reinforcing wires 14 are preferably inserted in the intermediate layer of rubber. The coil of wire 15 is preferably made by winding a wire of circular cross section on a mandrel and then grinding the outer surface on a centerless grinder so as to make it a practically continuous cylindrical surface. In actual practice it has been found expedient to grind down the coil so as to decrease its diameter to an amount equal to about two-thirds the diameter of the wire used in the coil. In this way, the space between the wires into which the rubber layer 12 may contract is practically eliminated.

In Figure 4 a modified form of coil is shown. The coil of wire 16 is made of wire of square cross section and is helically coiled so as to form in effect a flexible hollow cylinder. A coil of this type may be inserted in a hose in the same manner as described above and in the patent to which reference has been made. It will be apparent that in using this form of wire in constructing the non-compressible coil, there are no spaces into which the inner layer of rubber of the hose may contract so as to reduce the efficiency of the hose as a fluid pressure transmitting medium.

In Figure 5 I have shown a second modification of the non-collapsible coil of wire used to withstand the contracting forces of the hose. This coil is constructed of two wires 17 and 18 each having a cross section in the shape of a trapezoid, or equilateral triangle in which one of the points has been cut off. The wire 17 has its broadest surface at the outer surface of the coil while the coil 18 has its corresponding surface at the inner cylindrical surface of the coil. A hose using a coil of this construction has all the advantages as pointed out with respect to those shown in Figures 1 to 4. It has an additional advantage in that when the hose is flexed, there is no space between the coils into which rubber could contract and be pinched and frayed from the inner surface. When the hose is flexed the coil 17 will slide relative to the coil 18 and the increased outer radius and decreased inner radius of the bend of hose will thus be compensated, as is clearly shown in Figure 6.

While I have shown and described my invention as embodied in specific forms, it will be apparent that other forms may be constructed which will not depart from the principles of my invention. I therefore do not wish to limit my invention to the construction disclosed except as defined in the claim which follows:

I claim:

A flexible hose adapted to withstand high internal pressure without appreciable expansion, comprising a helix of relatively non-compressible wire circular in cross section and having its adjacent turns contacting one another, said helix having the outer surface ground away to form a substantially cylindrical outer surface lying in a plane externally of the mid-point of the wire, and an elastic tube about said helix tensioned so as to exert high radial pressure on the outer cylindrical surface of the coil.

In witness whereof, I hereunto subscribe my name this 21st day of April 1926.

CLIFFORD C. BRADBURY.